March 3, 1942.  E. S. PURINGTON  2,275,020

MODULATION SYSTEM

Filed July 6, 1939  3 Sheets-Sheet 1

INVENTOR
ELLISON S. PURINGTON.
BY
ATTORNEY

March 3, 1942.　　　E. S. PURINGTON　　　2,275,020
MODULATION SYSTEM
Filed July 6, 1939　　　3 Sheets-Sheet 2

INVENTOR
ELLISON S. PURINGTON.
BY
ATTORNEY

March 3, 1942.   E. S. PURINGTON   2,275,020
MODULATION SYSTEM
Filed July 6, 1939   3 Sheets-Sheet 3

INVENTOR
ELLISON S. PURINGTON.
BY
ATTORNEY

Patented Mar. 3, 1942

2,275,020

UNITED STATES PATENT OFFICE 2,275,020

MODULATION SYSTEM

Ellison S. Purington, Gloucester, Mass., assignor to John Hays Hammond, Jr., Gloucester, Mass.

Application July 6, 1939, Serial No. 283,020

4 Claims. (Cl. 179—171.5)

This invention relates to improved methods of frequency conversion and more specifically to improved methods of deriving side band energy from a carrier wave and a modulation wave.

In accordance with the present invention a pair of thermionic devices are connected as a push-pull modulator in such a way that each device passes current during substantially a half of the modulating cycle, with the output wave compounded or synthesized from definite contributions of the individual devices. The present methods are further characterized by use of circuits solely operative for modulation purposes, without being further complicated by amplification functions. Thus the entire side-band output is derived from electrical energy supplied by the carrier and modulation frequency sources. The separation of the modulation and the amplification functions simplifies the construction and adjustment of the entire system of which the push-pull modulator forms a part. High electrical efficiency of conversion results with the present methods of construction, due to the unidirectional conductivity of the rectifying devices, resulting in only a small percentage of the input energy being dissipated within the rectifier structure. The simplicity and high efficiency of these new arrangements constitute important advantages of the present invention.

Various other objects and advantages will be apparent as the nature of the invention is more fully disclosed.

The invention will be better understood by referring to the following description, taken in connection with the accompanying drawings forming a part thereof, in which certain specific embodiments thereof have been set forth for purposes of illustration.

Figure 1:
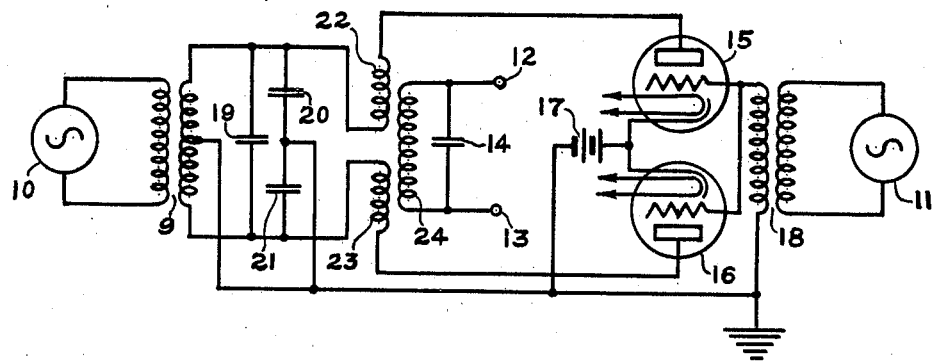
Fig. 1 is a schematic diagram of a push-pull modulation circuit embodying the present invention using triode tubes as rectifiers.

Referring to the drawings, Fig. 1 shows the sources of the high and low frequencies impressed upon the modulating system as sources 10 and 11, with source 10 preferably the source of the lower frequency, and the output energy of frequencies equal to the sum and difference respectively of the impressed frequencies is delivered to subsequent circuits, not shown, from terminals 12 and 13 across the condenser 14. The devices 15 and 16 are shown as triode rectifiers with substantially unidirectional conduction characteristics, here indicated as of the separate heater type with the cathodes positively biased with respect to ground by a battery 17, for which a resistor paralleled by a condenser may be substituted if desired. Grid power or voltage is supplied to the devices 15 and 16 in a parallel manner from source 11, through transformer 18. Plate power is supplied in a push-pull manner from source 10, through transformer 9, which may be resonated by condensers 19, 20, 21 to secure substantially unity power factor loading of the source 10. In the leads from the secondary of transformer 9 to the plates of the rectifier tubes 15 and 16 are coils 22 and 23 coupled to output coil 24, which is shunted by the condenser 14 above mentioned.

Figure 2:
Fig. 2 is a curve showing the wave form of thermionic currents passing through rectifying devices of the different rectifier devices of Fig. 1.

In the operation of the system shown in Fig. 1, if source 11 were absent the rectifier 15 would operate during substantially a half cycle of source 10, and rectifier 16 during the other half cycle of source 10, giving substantially half sine-wave pulses of current to the small bias battery 17. But with source 11 operative, these loops are chopped at radio frequency because of the variation of the active rectifier from a highly conductive condition to a non-conductive condition as the grid bias changes at the higher frequency rate. Thus the current through the cathodes to the battery 17 would be substantially as depicted in Fig. 2, with portion 25 representing current through coil 22 to tube 15, and portion 26 representing current through the coil 23 to tube 16. The coils 22 and 23 are coupled to the output circuit 14, 24, which in combination with subsequent circuits is selectively responsive to the first order side-bands and possibly to the higher impressed frequency, and is preferably non-responsive to other frequencies. The couplings should be properly sensed so that circuit 14, 24 is energized oppositely by high frequency pulses passing through the tubes. For example with source 10 not operative, and battery 17 reversed to make both tubes 15 and 16 simultaneously conductive, no energy would be delivered to circuit 14, 24, because the high frequency pulses in the two tubes would be of similar strength and would produce no net driving voltage. But with the tubes made conducting through operation of source 10, the high frequency pulses to the two tubes are unequal except when substantially zero, with each tube in turn actuating the output circuit while the other tube is non-conducting.

Figure 3:
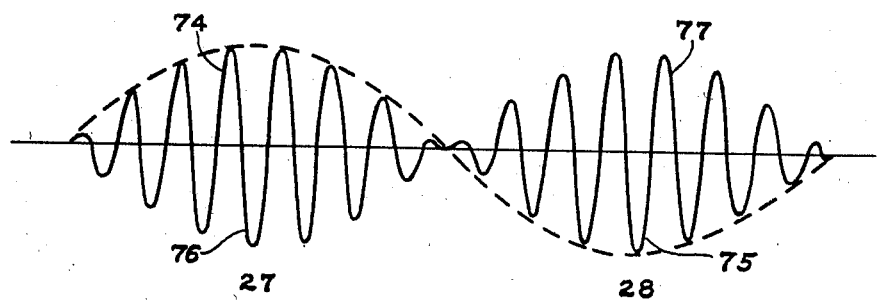
Fig. 3 is a curve showing the wave form in filter circuits suitably energized from the output of the rectifiers.

As a result, power is transmitted to the circuit 14, 24 to develop a voltage across terminals 12, 13, as depicted in Fig. 3, with portion 27 due substantially to tube 15, with plate wave form 25 of Fig. 2, and portion 28 due to tube 16 with plate wave form 26 of Fig. 2.

It should be observed that due to the difference of coupling of the two plate currents, the envelope of Fig. 3 expressed by the dotted lines is substantially a complete sine wave of the lower impressed frequency, whereas the envelope of the pulses to bias battery 17 would be the two half portions of a rectified sine wave, as indicated by the dotted lines in Fig. 2. Taken as a whole, the wave form of Fig. 3 which is recurrent on successive cycles of source 10, is of the general nature $$e_{12\text{-}13} = A \sin pt \sin \omega t = \frac{A}{2}[\cos(\omega-p)t - \cos(\omega+p)t]$$

in which $p$ and $\omega$ refer to the lower and higher frequencies impressed on the system. Although the output circuit is responsive to the higher frequency pulses, the output voltage wave form contains side-band frequencies only.

If the sense of one of the couplings 22 or 23 were reversed so that the circuit 14, 24 were influenced by the sum of the high frequency pulses in the two tubes, instead of the difference, the output wave form would have an envelope which is not $A \sin pt$, which is alternately positive and negative, but is represented by $$A\sqrt{\frac{1-\cos 2pt}{2}}$$

which does not reverse in sign but must be considered either always positive or always negative. The output wave form in this case is analyzable into a carrier and an infinite number of side bands. The senses of the couplings 22 and 23 therefore are important in the operation of the invention. With the senses properly chosen in design or by experiment, and slight adjustments of these couplings in case of tube inequalities, and with circuits also otherwise properly adjusted, this system has been found to produce first-order side-band energy highly free from carrier and from higher-order side-band energy.

It will be understood that the output circuit may be tuned especially to the side bands, and that the nature of the tuning will influence the relative magnitude of the two side bands. Thus if circuit 14, 24 were tuned to the lower-order side bands, the carrier would still be balanced out and the upper side band highly suppressed. Thus this method of operation permits production of single side band energy by balancing out of the carrier and by electrical rejection of one of the side bands. In addition to production of double side-band energy, this arrangement is also useful for frequency conversion, in which a wave form is produced of frequency equal for example to the sum of two impressed frequencies.

Further if one of the impressed frequencies is modulated, the output of the converter will be modulated. Thus for example, source 10 may represent energy at 100 kcs. modulated at 1000 cycles, source 11 may represent energy at 900 kcs., unmodulated, then with suitable tuning, an output at 1000 kcs. modulated at 1000 cycles can be produced. That is, the systems herein described are also useful for frequency conversion purposes in transmitters, analogous in broad functioning to that of the first detectors of "superheterodyne" receivers.

The methods of push-pull modulation and frequency conversion of the present invention may use two element unidirectionally conducting devices such as a thermionic diode rectifier, with the voltage impressed from plate to ground containing both the lower frequency impressed component and the higher frequency impressed component. In many instances, the output circuit may be from cathode to ground. The tube conduction depends on the difference of the plate and cathode potentials with respect to ground which is a function of the input impressed frequencies as well as the output wave form resulting from the tube conduction. Since the output effect is produced by a current conjointly determined by the impressed wave forms and the output wave form, complete mathematical analysis is difficult and is not here attempted. It will suffice to state that the wave forms of currents in various rectifier or unidirectionally conducting devices have the general properties of the wave forms of the two portions of Fig. 2, and that various connections may be used to combine such wave forms to yield the desired results.

Figure 4:
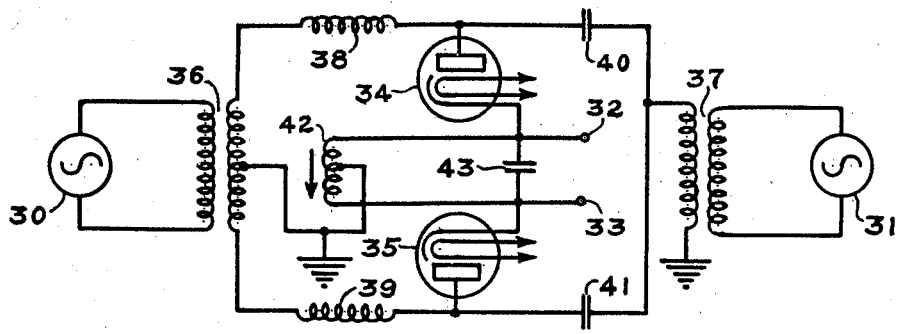
Fig. 4 is a schematic diagram showing a push-pull modulator system analogous to that of Fig. 1 but using diode rectifying devices.

In Fig. 4, a circuit is shown with a low frequency source 30, and a high frequency source 31, so connected to a rectifier system as to produce side-band voltage across output terminals 32 and 33. Two rectifying devices 34 and 35 are provided the plates of which are driven from source 30 as well as from source 31, so that the plate-to-ground potential is virtually the sum of the low and high frequency voltage effects. Some of the power to the tube 34, corresponding to the wave form of the envelope of the pulses, is delivered from the source 30 through a transformer 36, and some of the power, corresponding to the pulses themselves, is delivered from source 31 through a transformer 37. Connected in the plate power leads are chokes 38 and 39, which pass the low frequency and direct current of the system, and condensers 40 and 41 which pass the higher frequency currents of the system. When the ratio of high frequency to low frequency is great, say 100 to 1, then the chokes 38, 39, and condensers 40 and 41 are easily chosen so that the impressed voltage from plate to ground is very exactly the sum of the secondary voltages of the transformers 36 and 37. If this ratio is small, the impedances 38 to 41 may be replaced by resistors. When the secondary voltage of the transformer 36 is at its instantaneous peak maximum, so that the plate of the rectifier 34 is positive with respect to ground and the plate of the rectifier 35 is negative with respect to ground, the high frequency pulses due to source 31 will be strong in the rectifier 34 and weak or absent in the rectifier 35.

These pulses are delivered to the two rectifiers 34 and 35 in phase, whereby the outputs from cathodes to ground into the output circuit 42, 43 are connected in a balanced manner so that the output is determined by the difference of the pulses in the two rectifiers. Thus when the system is not energized by the low frequency source, the power from the high frequency source is injected onto the plates of both rectifiers 34 and 35 simultaneously in phase and the rectified pulses through the cathodes to ground are so coupled as to balance each other, with no power delivered to the output. As the modulation cycle progresses due to voltages impressed from the source 30 the high frequency pulses predominate first through rectifier 34 and then through rectifier 35, with the result that output high frequency energy is modulated in a push-pull manner, free from the presence of the original higher frequency. It has been found by tests that with a fixed source of high frequency energy, the output side bands are proportional to the low frequency impressed voltage over a wide range, and that this system is therefore useful when the low voltage is variable as in telephonic communication system, as well as in the simpler telegraphic systems in which the low frequency is of fixed strength.

Figure 5:
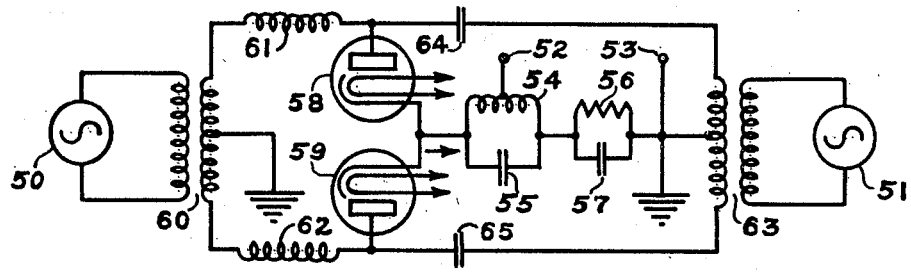
Fig. 5 is a schematic diagram showing an arrangement suitable for operating into an output system with one side grounded.

Fig. 5 shows a similar arrangement for use when the modulated output is desired with one side at zero radio potential with respect to ground. The two sources 50 and 51 are the sources of low and high frequency input energy respectively, and 52 and 53 are the terminals through which side-band power is delivered to the load on the system.

The output terminal 52 is connected to the mid point of a coil 54 across which is connected a condenser 55. One side of the coil 54 is connected through a resistor 56 and condenser 57 to ground and the other side is connected to the cathodes of the rectifying devices 58 and 59. The source 50 is connected through a transformer 60 and chokes 61 and 62 to the plates of the rectifiers 58 and 59. The source 51 is connected through a transformer 63 and condensers 64 and 65 to the plates of the rectifiers 58 and 59.

The operation of this system is somewhat different from that shown in Fig. 4, because both impressed frequencies are injected into the system in a push-pull manner. It will be understood that chokes 61 and 62 permit high frequency voltage but substantially no low frequency voltage to build up between the secondary of transformer 60 and the plates of the rectifiers 58 and 59 and condensers 64 and 65 permit low frequency voltage but substantially no high frequency voltage to be built up between the secondary of transformer 63 and the plates of the rectifiers 58 and 59. Accordingly as before, the instantaneous plate-to-ground potential is virtually the sum of the instantaneous potentials of the secondaries of the input transformers. The plates of the two rectifiers 58 and 59 are out of phase in a radio frequency sense whereas in Fig. 4 the plates of the two rectifiers 34 and 35 are in phase in a radio frequency sense. At the point in the modulation cycle when the voltage across the secondary of the transformer 60 is zero, the transformer 63 alternately delivers a high frequency pulse through rectifier 58, and then through rectifier 59, with these pulses timed 180 electrical degrees apart in the high frequency cycle. Therefore the pulses through the output circuit 54, 55, 56, 57 to ground are of double high frequency, with no high frequency itself present provided circuit balance exists. But when voltage exists across the secondary of the transformer 60, the rectified high frequency pulses through the two rectifiers 58 and 59 are unequal, so that in addition to double high frequency pulses to the output circuit there is a high frequency component which is substantially proportional to the absolute value of the voltage of the secondary of transformer 63, regardless of sign. As a result, due to the by-passing of the double frequency and D. C. components of the rectified output, and to symmetrical resonance of the output circuit, the output voltage from cathode to ground is push-pull modulated, yielding the equivalent of energy localized in the upper and lower side frequencies, or in upper and lower side band if source 51 is itself modulated.

The resistor 56 and condenser 57, it will be understood, may have a long time constant to offer D. C. impedance to the rectified output to bias the cathodes positive with respect to ground. This has the result of reducing the strength of the high frequency pulses through the rectifiers 58 and 59 when the voltage across the secondary of the transformer 60 is zero, and this circuit 56, 57 may be adjusted to optimum value for best efficiency and wave form, or may be omitted if desired. This illustrates merely one of several possible embodiments which would occur to one skilled in the art. For example, the circuits could be balanced to correct for inequalities of rectifier internal impedance by adjusting the mid-taps of the secondaries of transformers 60 and 63, or by use of different series resistors in the plate leads of the rectifiers 58 and 59. Such details are not herein indicated, but may be applied whenever desired.

Figure 6:
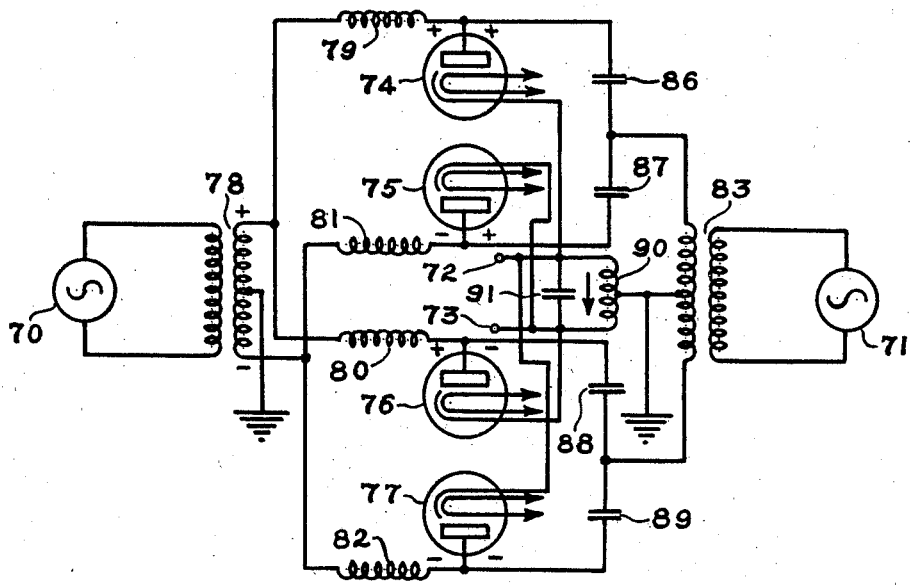
Fig. 6 is a schematic diagram showing an arrangement composited from the arrangements of Figs. 4 and 5.

In Fig. 6 a system of push-pull modulation is shown which is actuated from input sources 70 and 71 and which delivers sum and difference frequency energy to the output terminals 72 and 73. In this system four rectifying devices 74—77 are employed. The source 70 is connected to the system by a transformer 78 one side of the secondary of which is connected through chokes 79 and 80 to the plates of the rectifiers 74 and 76 and the other side through chokes 81 and 82 to the plates of the rectifiers 75 and 77. The source 71 is connected to the system by a transformer 83 one side of the secondary of which is connected through condensers 86 and 87 to the plates of the rectifiers 74 and 75 and the other side through condensers 88 and 89 to the plates of the rectifiers 76 and 77. The cathodes of the rectifiers 74 and 77 are connected to the output terminal 72 and to one side of a coil 90 and the cathodes of the rectifiers 75 and 76 are connected to the output terminal 73 and to the other side of the coil 90. A condenser 91 is connected across the coil 90.

This circuit arrangement has the composite properties of the circuits of Figs. 4 and 5. The marks + and − indicate instantaneous potentials with respect to ground, both for low and high frequency excitation sources, at some particular instant when the plate of rectifier 74 is at the highest potenial of all the rectifiers. For Fig. 4, the rectifiers were oppositely phased for low frequency, similarly phased as to high frequency and oppositely phased as to output connections. In Fig. 6 the pair of rectifiers 74 and 75 and the pair of rectifiers 76 and 77 function respectively as the rectifiers of Fig. 4. On the other hand, in Fig. 5 the rectifiers 58 and 59 were oppositely phased both for low frequency and for high frequency but similarly phased as to output connections. In Fig. 6, the pair of rectifiers 74 and 77 and the pair of rectifiers 75 and 76 function respectively as the rectifiers of Fig. 5. The particular advantage of the system shown in Fig. 6 is that sources 70 and 71 are loaded in a balanced manner, delivering very nearly the same power to the output on successive positive and negative swings of the high frequency source.

Or from another point of view, the complete push-pull modulated wave form of Fig. 3 is composed of four portions, two parts above the straight center zero line derived from rectifiers oppositely phased in the low frequency sense, and two parts below also similarly derived. The portions of output are indicated by numbers 74, 75, 76 and 77 which roughly speaking may be considered due to operation of the similarly numbered rectifiers of Fig. 6. Thus rectifiers 74 and 76 are operative during one half of the low frequency cycle on both portions of the high frequency wave to build up the entire modulated sine wave loops of the output. Rectifiers 77 and 75 operate similarly on the other portions of the low frequency cycle. Also rectifiers 74 and 77 are joined to the same side of the output circuit but are oppositely timed in a high frequency sense, similarly rectifiers 75 and 76.

The advantage of the circuit shown in Fig. 6 is in electrical smoothness of operation in minimizing harmonics of the high frequency in the power flow to the output circuit. But in most cases two rectifier type systems with half wave high frequency rectification will prove sufficient.

Figure 7:
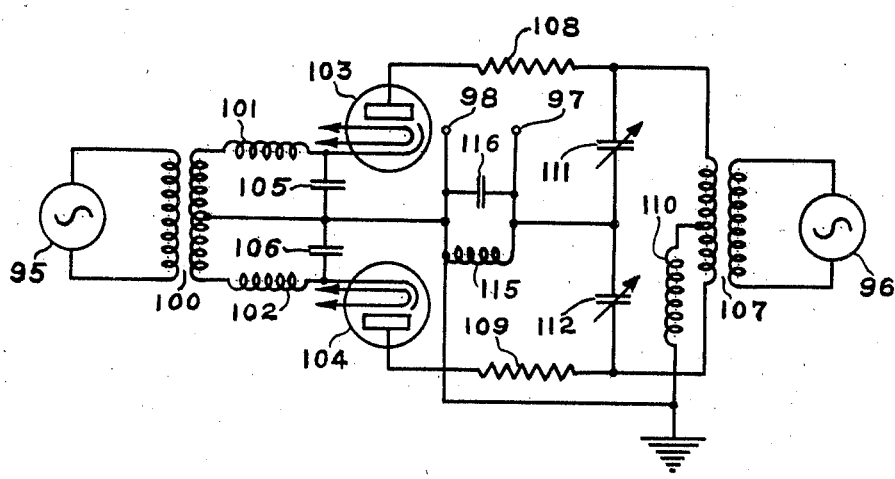
Fig. 7 is a schematic diagram showing an arrangement in which the cathodes of the rectifiers are at ground potential as regards the higher of the frequencies impressed upon the system.

In Fig. 7, a modified two rectifier arrangement is indicated, using sources 95 and 96 of low and high frequency respectively, delivering side frequency or side-band energy to terminals 97 and 98. The low frequency source 95 is connected through a transformer 100 and high frequency chokes 101 and 102 to the cathodes of rectifying devices 103 and 104. Condensers 105 and 106 are connected between the cathodes of the rectifiers 103 and 104 and ground. The high frequency source 96 is connected through a transformer 107 and resistors 108 and 109 to the plates of the rectifiers 103 and 104. The center of the secondary of the transformer 107 is connected to ground through a high frequency choke 110. For resonating the secondary of the transformer 107 variable condensers 111 and 112 may be provided, the junction point of which is connected to the output terminal 97. An inductor 115 and a condenser 116 are connected between the output terminals 97 and 98.

In the operation of the modified form of the invention shown in Fig. 7 the low frequency energy from the source 95 is impressed from the cathodes of the rectifiers 103 and 104 to ground by means of the transformer 100, which may be resonated by condensers 105 and 106 in conjunction with the high frequency chokes 101 and 102. The high frequency source 96 impresses energy on the plates of the rectifiers 103 and 104 in a balanced manner. The secondary of the transformer 107 may be resonated by the variable condensers 111 and 112, which further may be adjusted approximately equally to make their junction point, connected to output terminal 97, a neutral point as regards the high frequency currents due to the source 96. The resistors 108 and 109 may be used to equalize the loading.

In this circuit, the high frequency voltage is developed only in the plate circuit of the system, the cathodes being by-passed to ground. Rectifier conduction depends upon the difference of the instantaneous voltage of the plate and the cathode, and because of the low frequency voltage injected from cathodes to ground in a balanced manner, the high frequency space currents of the rectifiers 103 and 104 being modulated out of phase in the low frequency cycle. Because of the presence of side-band frequencies in the space currents, and impedance at those frequencies from plates to ground, side-band voltage is built up from plates to ground. These side-band voltages are similarly phased because the carrier or high-frequency voltages, although oppositely phased, are modulated out of phase. Therefore the high frequency neutral point at the junction of condensers 111 and 112 is not a neutral point for the side-band voltage, and side-band energy is built up in the tuned circuit 115, 116, from which circuit the original high frequency is excluded.

A circuit of the type of Fig. 7 may be used in case cathode-to-ground capacity of the rectifier tube is so great that the methods described in connection with Fig. 4 and Fig. 5 cannot be used. The basic plate circuit arrangement of Fig. 7 is readily modified to be operative in other manners, for example the plates could be arranged to be energized at high frequencies in parallel analogous to Fig. 4, and the output circuit for side-band energy could be connected from plate to plate to yield a balanced output.

Figure 8:
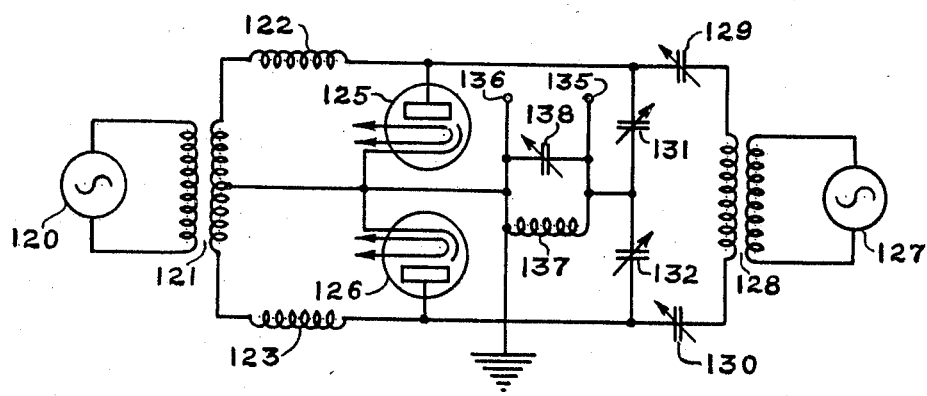
Fig. 8 is a schematic diagram showing an arrangement in which the cathode is at ground potential for both the higher and lower of the impressed frequencies.

For very high operating frequencies which make it desirable that the cathodes be directly connected to ground for all frequencies, a circuit of the type shown in Fig. 8 may be employed. In this arrangement low frequency source 120 is connected through a transformer 121 and high frequency chokes 122 and 123 to the plates of rectifying devices 125 and 126. The high frequency source 127 is connected through a transformer 128 and variable condensers 129 and 130 to the plates of the rectifiers 125 and 126. Bridged across the secondary of the transformer 128 are two variable condensers 131 and 132 the junction point between them being connected to one output terminal 135. The other output terminal 136 is connected to the cathodes of the rectifiers 125 and 126. An inductance 137 and a variable condenser 138 are bridged across the output terminals 135 and 136.

The arrangement of the circuit shown in Fig. 8 as well as that of Fig. 7 is analogous to Fig. 5 in that the circuits are energized in a balanced manner both due to the lower and higher frequency sources. Low frequency energy is fed to the plates of the rectifiers 125 and 126 through high frequency chokes 122 and 123, while high frequency energy is fed to these plates through low frequency blocking condensers 129 and 130. Condensers 131 and 132 serve to transfer side-band energy from the plates of the rectifiers 125 and 126 to the output circuit 137 and 138. The radio input energy may be resonated by condensers 129, 130, 131, and 132, in conjunction with the plate-cathode capacitance of the rectifiers 125 and 126, and condenser 138 may be so adjusted as to give maximum output on the desired frequencies.

It will be understood that only a few of the wide variety of forms of circuits possible have been shown and any person skilled in the art on the basis of the disclosures of the present circuits could readily devise other operative arrangements. Further although I have shown diode rectifiers of the thermionic type, it is to be understood that other partially or completely unidirectional conductors may be used, such as crystal or copper oxide type rectifiers or grid controlled rectilers. The invention is capable of various uses and is only to be limited in accordance with the following claims.

What is claimed is:

1. A system of the class described comprising two pairs of rectifiers, a source of carrier energy having a pair of terminals connected through condensers to like electrodes of said rectifiers to supply energy in push-pull to said pairs of rectifiers and in parallel to the individual rectifiers of each pair, a source of modulating energy having a pair of terminals connected through inductances to said like electrodes of said rectifiers to supply energy in push-pull to the individual rectifiers of each pair, and a work circuit connected to be actuated in response to the differential effect of the instantaneous currents passed by the individual rectifiers of each pair, whereby one of said rectifiers is conductive for each half cycle of said carrier energy, the particular rectifier conductive at each instant being determined by the relationship of the voltages of said carrier energy and said modulating energy, the energy in the work circuit being built up from the combined energy passing through all of said rectifiers.

2. A modulating system comprising two pairs of rectifiers, each rectifier including a cathode and an anode, means for connecting together the anodes of each pair, a first terminal to which are connected the cathodes of two rectifiers, one of each pair, a second terminal to which are connected the cathodes of the two remaining rectifiers, one of each pair, a first source of wave energy, symmetrical means for impressing said wave energy in phase opposition to said pairs of rectifiers and in phase to the individual rectifiers of each pair, a second source of wave energy, symmetrical means for impressing said last wave energy in phase opposition to the individual rectifiers of each pair and in phase to one rectifier of one pair and another rectifier of the other pair, and a load circuit connected to said first and second cathode terminals.

3. A modulating system comprising two pairs of rectifiers, each rectifier including a cathode and an anode, means for connecting together the anodes of each pair, a first terminal to which are connected the cathodes of two rectifiers, one of each pair, a second terminal to which are connected the cathodes of the two remaining rectifiers, one of each pair, a source of modulating wave energy, symmetrical means for impressing said modulating wave energy in phase opposition to said pairs of rectifiers and in phase to the individual rectifiers of each pair, a source of carrier wave energy, symmetrical means for impressing said carrier wave energy in phase opposition to the individual rectifiers of each pair and in phase to one rectifier of one pair and another rectifier of the other pair, and a load circuit connected to said first and second cathode terminals.

4. A modulating system comprising two pairs of rectifiers, each rectifier including a cathode and an anode, an inductance connected to each of the rectifier anodes, the inductances of the respective rectifier pairs having a common terminal, a first terminal to which are connected the cathodes of two rectifiers, one of each pair, a second terminal to which are connected the cathodes of the two remaining rectifiers, one of each pair, a source of carrier wave energy, two pairs of condensers, each pair serially connected between the anodes of alternate rectifiers, symmetrical means having its opposite terminals connected to respectively the common terminals of said pairs of condensers for impressing said carrier wave energy in phase opposition to the individual rectifiers of each pair and in phase to one rectifier of one pair and another rectifier of the other pair, a source of modulating wave energy, symmetrical means connected between the common inductance terminals for impressing said modulating wave energy in phase opposition to said pairs of rectifiers and in phase to the individual rectifiers of each pair, and a load circuit connected to said first and second cathode terminals.

ELLISON S. PURINGTON.